United States Patent
Gibbons et al.

(10) Patent No.: US 6,412,019 B1
(45) Date of Patent: *Jun. 25, 2002

(54) METHOD AND MECHANISM FOR INVOCATION ON OBJECTS WITH INTERFACE INHERITANCE

(75) Inventors: Jonathan J. Gibbons, Mountain View; Graham Hamilton, Palo Alto; Peter B. Kessler, Palo Alto; Michael L. Powell, Palo Alto; Sanjay R. Radia, Fremont, all of CA (US)

(73) Assignee: Sun Microsystems, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/783,913

(22) Filed: Jan. 15, 1997

Related U.S. Application Data

(63) Continuation of application No. 08/307,929, filed on Sep. 19, 1994, now abandoned.

(51) Int. Cl.[7] ............................................... G06F 9/44
(52) U.S. Cl. ..................................................... 709/315
(58) Field of Search ................................ 709/303, 315, 709/316; 395/705, 701; 717/5, 1, 100, 116; 707/103, 103 R, 103 Y, 103 Z

(56) References Cited

U.S. PATENT DOCUMENTS

| | | | | |
|---|---|---|---|---|
| 5,327,562 A | * | 7/1994 | Adcock | 395/700 |
| 5,339,438 A | * | 8/1994 | Conner et al. | 395/700 |
| 5,442,793 A | * | 8/1995 | Christian et al. | 395/700 |
| 5,566,302 A | * | 10/1996 | Khalidi et al. | 395/200.09 |
| 5,600,838 A | * | 2/1997 | Guillen et al. | 395/683 |
| 5,768,588 A | * | 6/1998 | Endicott et al. | 395/683 |
| 5,794,038 A | * | 8/1998 | Stutz et al. | 395/683 |
| 5,794,041 A | * | 8/1998 | Law et al. | 395/701 |
| 5,884,316 A | * | 3/1999 | Bernstein et al. | 707/103 |
| 5,907,707 A | * | 5/1999 | Ramalingam et al. | 395/701 |
| 6,044,380 A | * | 3/2000 | Gerard et al. | 707/103 |

OTHER PUBLICATIONS

R. Connor et al, "An Object Addressing Mechanism for Statically Typed Languages wit Multiple Inheritance", OOPSLA 89, pp. 279–285, 1989.*

OMG "Joint Submission on Interoperability and Initialization", chapter 10, Mar. 1994.*

G. Hamilton, et al, Subcontract: A flexible base for distributed programming, ACM, SIGOPS, Nov. 1993, pp. 69–79.*

* cited by examiner

*Primary Examiner*—St. John Courtenay, III
*Assistant Examiner*—Sue Lao
(74) *Attorney, Agent, or Firm*—Blakely Sokoloff Taylor & Zafman

(57) ABSTRACT

Methods and apparatus in an object oriented programming environment for invocation of objects with interface inheritance. An object reference using mtables contains two parts, more specifically, a pointer to the data for an object and a pointer to the methods on the object. The methods on the object are represented by a collection of mtables. An mtable for a given interface consists of pointers to mtables for inherited interfaces and pointers to functions implementing the operations declared in the interface. An mtable pointer in an object reference points to an mtable for an apparent interface of the object reference. Mtables for any inherited interfaces are reached by indirection from the mtables for the apparent interface.

21 Claims, 7 Drawing Sheets

```
struct A_40_mtbl
{
        typedef void (*_pf_a_operation_100) (any_obj *obj;
        type_id *_type_id;
        short int _methods;
        short int _bases;
        _pf_a_operation_100 a_operation_100;
};
struct B_42_mtbl
{
        typedef void (*_pf_b_operation_102) (any_obj *obj);
        type_id *_type_id;
        short int _methods;
        short int _bases;
        _pf_b_operation_102 b_operation_102;
};
struct C_44_mtbl
{
        typedef void (*_pf_c_operation_104) (any_obj *obj;
        type_id *_type_id;
        short int _methods;
        short int _bases;
        _pf_c_operation_104 c_operation_104;
        A_40_mtbl *_as_A_40;
        B_42_mtbl *_as_B_42;
};
struct D_46_mtbl
{
        typedef void (*_pf_d_operation_106) (any_obj *obj;
        type_id *_type_id;
        short int _methods;
        short int _bases;
        _pf_d_operation_106 d_operation_106;
        B_42_mtbl *_as_B_42;
};
struct E_48_mtbl
{
        typedef void (*_pf_a_operation_108) (any_obj *obj);
        type_id *_type_id;
        short int _methods;
        short int _bases;
        _pf_a_operation_108 a_operation_108;
        A_40_mtbl *_as_A_40;
        C_44_mtbl *_as_C_44;
        B_42_mtbl *_as_B_42;
        D_46_mtbl *_as_D_46;
};
```
⎱ 120

*Figure 5*

```
A_40_mtbl A_40_std_mtbl =
{
        &A_40_tid,
        1,    0,
        &A_40_methods: :a_operation_100
};
B_42_mtbl B_42_std_mtbl =
{
        &B_42_tid,
        1,    0,
        &B_42_methods: :b_operation_102
};
C_44_mtbl C_44_std_mtbl =
{
        &C_44_tid,
        1,    2,
        &C_44_methods: :c_operation_104,
        &A_40_std_mtbl,
        &B_42_std_mtbl
};
D_46_mtbl D_46_std_mtbl =
{
        &D_46_tid,
        1,    1,
        &D_46_methods: :d_operation_106,
        &B_42_std_mtbl
};
E_48_mtbl E_48_std_mtbl =
{
        &E_48_tid,
        1,    4,
        &E_48_methods: :a_operation_108,
        &A_40_std_mtbl,
        &C_44_std_mtbl,
        &B_42_std_mtbl,
        &D_46_std_mtbl
};
```
⎬ 130

*Figure 6*

METHOD AND MECHANISM FOR INVOCATION ON OBJECTS WITH INTERFACE INHERITANCE

This is a Continuation Application of Application Ser. No. 08/307,929, filed Sep. 19, 1994 and now abandoned.

BACKGROUND OF THE INVENTION

1. Field of the Invention

The invention relates to the field of object-oriented programming. More particularly, the invention relates to invocation on objects with interface inheritance.

2. Description of Related Art

Object-oriented programming is a method of software design implementation in which programs are organized as cooperative collections of objects. An object is a region of storage in a program and has a state, a behavior and an identity. Each object represents an instance of some class. A class is a set of objects that share a common structure and a common behavior. In an object-oriented programming language such as C++, a class is a user-defined type. A class declaration specifies the set of operations that can be applied to objects of the class.

An inheritance relationship unites a hierarchy of classes of a given program. A class can be derived from another class, and a class from which another class is derived is called a base class of the derived class. Further, a class may be derived from more than one class and inherits the operations and representation of each base class from which it is derived.

Given an object of some class, determining and choosing how to perform a dispatch (look-up) to the methods of the inherited classes is a problem. "Method" is a term which comes from Smalltalk, an object-oriented programming language, and is equivalent to "member functions" in C++. "Method" represents an operation declared as a member of a class.

In an interface inheritance, interfaces only inherit the definition of operations from other interfaces. In an implementation inheritance, interfaces inherit both the definition of the operation as well as the implementation of the operation from a base class definition. C++ uses implementation inheritance. Most C++ commercial products (compilers) use the concept of a vtable. A vtable is defined when an object is created, and has an entry for each method for each object requiring a dispatch to a possibly inherited implementation. A vtable typically consists of a list of pointers to methods. A Vtable typically also contains pointers to vtables for each of its base classes.

FIG. 1 illustrates one vtable implementation. The vtable implementation consists of BMW part 32 and its vtables 34, 35 and 36. BMW part 32 is derived from Vptr MW part 30, Vptr BW part 31 and Vptr W part 33. Vptr MW part 30 and BW part 31 are derived from Vptr W part 33. (See *The Annotated C++ Reference Manual* by Margaret A. Ellis and Bjarne Stroustrup, Addison-Wesley Publishing Co., Massachusetts, p. 235 §10.10c.)

Disadvantages of using vtables are varied. Vtables for the base methods must be filled in to perform implementation inheritance. In addition, vtables for the base classes are specific for the derived class that the vtables are actually in and the base class that vtables are referring to. For each new derived class, a separate base vtable for each base class must be created. Thus, vtable implementation requires many vtables.

Further, the pointers to the vtables are typically mixed in with the data for the instance value variables of the classes themselves. In a typical vtable implementation, pointers point to the methods as well as the base object instances themselves which creates difficulty in moving the data structure from one address space to a different address space. Hence, the limitations of vtables include the lack of the ability to map object instances between address spaces and the number and complexity of the vtable entries.

SUMMARY OF THE INVENTION

The invention provides a method and apparatus for invocation of objects with interface inheritance. More specifically, the invention provides mtables as dispatch mechanism for object references that support only interface inheritance. An object reference using mtables contains two parts, more specifically, a pointer to the data for an object and a pointer to the methods on the object. The methods on the object are represented by a collection of mtables.

An mtable for a given interface consists of pointers to mtables for inherited interfaces and pointers to functions implementing the operations declared in the interface. An mtable pointer in an object reference points to an mtable for an apparent interface of the object reference. Mtables for any inherited interfaces are reached by indirection from the mtable for the apparent interface in the preferred embodiment.

Unlike vtables, the structure for an mtable is simple and may be implemented in essentially any programming language. Object references have a well known structure and hence may be passed from one language to another without modification. In addition, the data for an object is separated from the pointers to the methods on the object in an mtable. This separation allows potential mapping of data for an instance from one address space to another.

To invoke an operation on an mtable object reference requires one indirection from the object reference to the mtable for the interface, and one indirect call through a function pointer in the mtable. An additional indirection is used in the embodiment of the present invention to invoke methods from inherited interfaces. The additional indirection is from the mtable of the apparent type to the mtable for the type which declared the operation.

Widening is the process of creating a less derived object reference from a more derived object reference and is implemented by constructing a new object reference that consists of the original representation pointer and a pointer to the mtable for the wider interface. Narrowing, which is the process of creating a more derived object reference from a less derived object reference is implemented by constructing a new object reference that consists of the original representation pointer and a pointer to the mtable for the narrower interface.

Advantages of using mtables over prior art object reference implementations are that mtables support alternate implementations, mtables may be used from multiple languages, and mtables are small and fast. In addition, the method of the present invention allows mapping of data. Further, data does not have to be altered for widening or narrowing, and there is no possibility of copying only a widened view of the data when copying a widened object reference as an instance of the wider interface.

BRIEF DESCRIPTION OF THE DRAWINGS

FIG. 5 illustrates exemplary C++ type declarations for the mtables for the exemplary interface hierarchy illustrated in FIG. 4.

FIG. 6 illustrates exemplary constructors for the mtables illustrated in FIG. 5.

DETAILED DESCRIPTION OF THE INVENTION

Apparatus and methods for mtables as a dispatch mechanism for object references that support only interface inheritance are disclosed. An mtable (method table) is a table of function pointers as well as pointers to additional mtables, one mtable per base class with each mtable containing pointers to the appropriate subset of methods visible to that base class.

Figure 1:
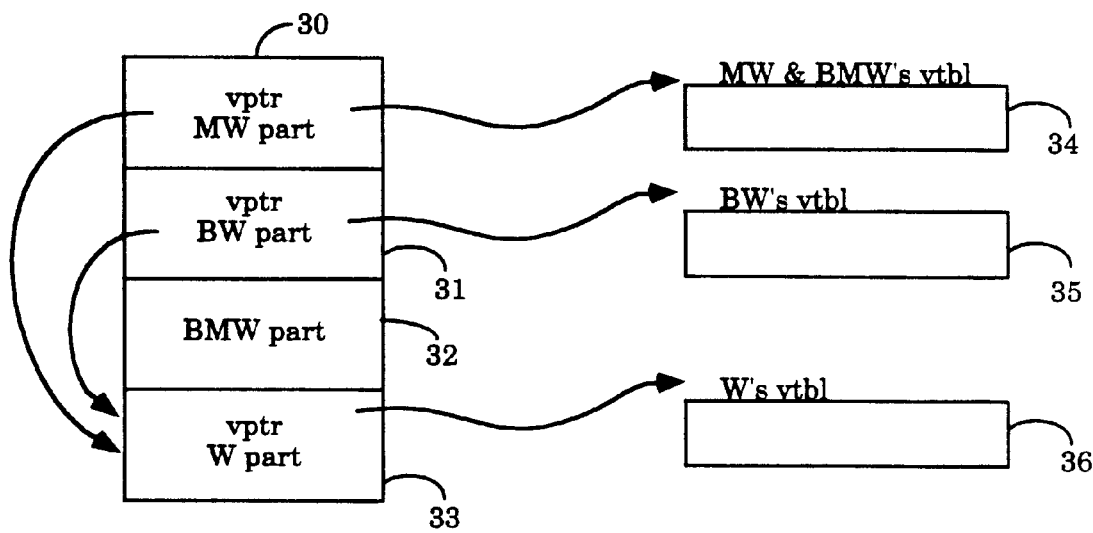
FIG. 1 illustrates an exemplary implementation of vtables.
Figure 2:
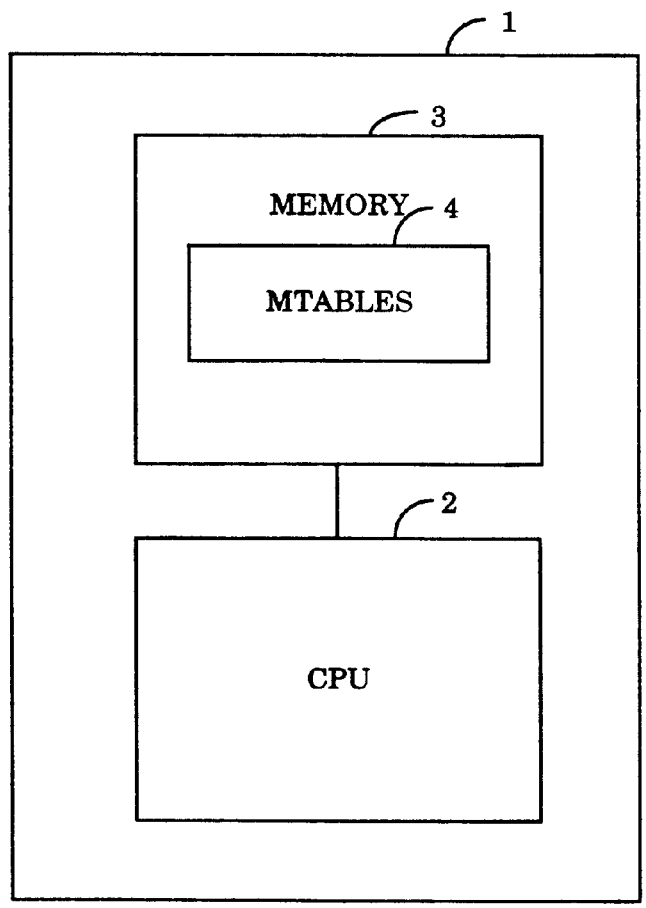
FIG. 2 is a system block diagram illustrating the present invention.

FIG. 2 is a system block diagram illustrating the present invention. Computer 1 has a CPU 2 coupled to memory 3. Mtables 4 of the present invention reside in memory 3.

Figure 3:
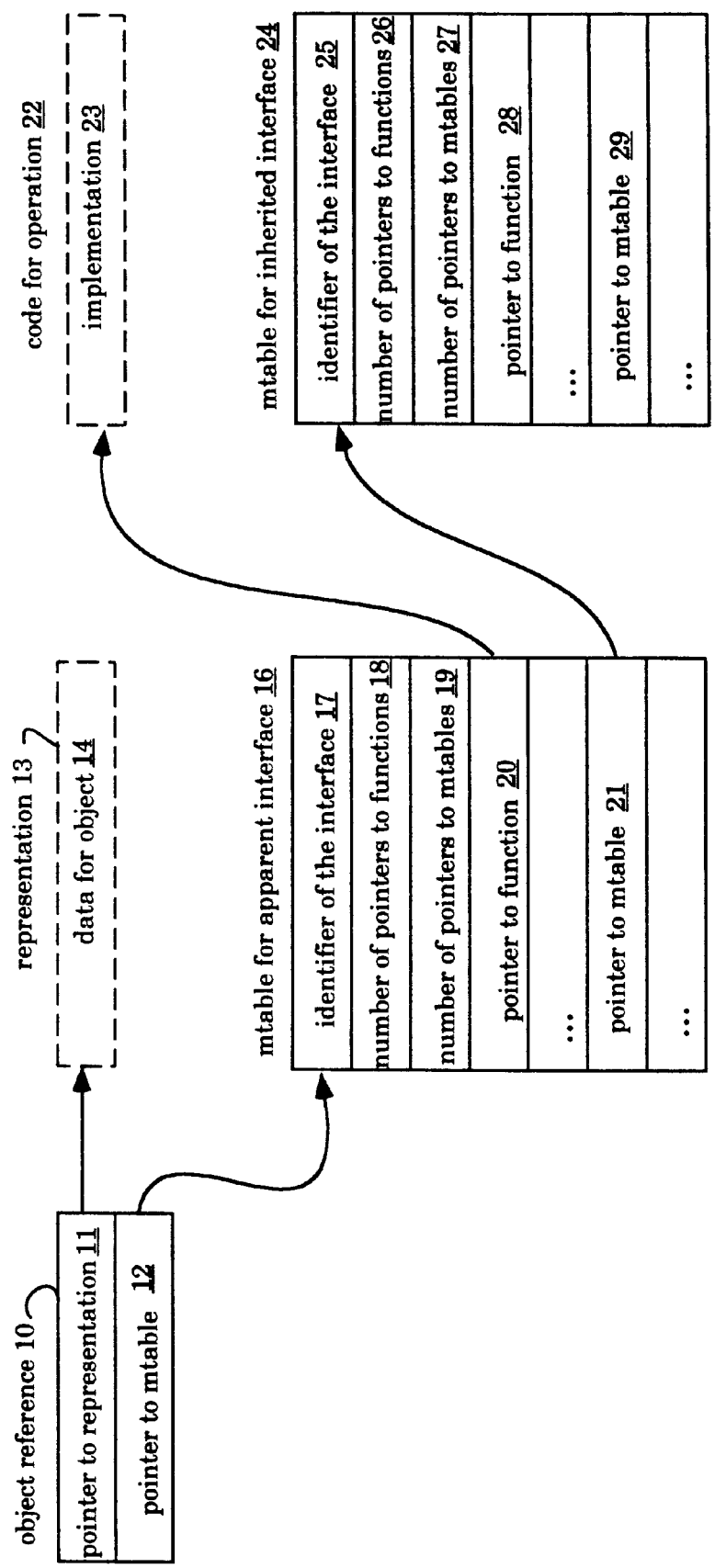
FIG. 3 illustrates an exemplary implementation of mtables of the present invention.

FIG. 3 is an exemplary implementation of mtables of the present invention. Object reference 10 is represented by a pair of pointers, with one pointer 11 pointing to representation 13 of the object represented by the object reference, and the other pointer 12 pointing to mtable 16, a table of function pointers and base mtables.

Mtable 16 has pointers 20 pointing to code 22 for the methods of the apparent interface and pointers 21 to mtables 24 for inherited interfaces. Mtable 16 also has fields, namely identifier 17 and count 18 of the number of pointers 20 to functions and count 19 of the number of pointers 21 to mtables. Mtable 24 in turn, has pointers 28 pointing to functions for that interface and pointers 29 pointing to base mtables. Mtable 24 also contains fields 25–27. Hence, the method of the present invention provides for an object representation that separates the data for an object from the pointers to methods for that object. In addition, the object may be referred to as a position independent object, if by separating out the address-space-specific pointers to the method tables and functions, the data members themselves do not contain any pointers or other address-space-specific information.

An mtable can also contain fields which allow them to be navigated by generic traversal methods. These fields identified in FIG. 3 as 17–19 and 25–27, consist of an identifier for the type of the mtable, a count of the number of method pointers, and a count of the number of base mtable pointers in the mtable. Using these fields, for example, one can determine at runtime the inheritance hierarchy represented in a graph of mtables without having to see the interface declarations in an interface definition language. These fields could also be used to provide range checks in the code that access the method pointers and base mtable pointers of the mtable. In addition, the identifier may either be in the same mtable itself, or pointed to by the field in the mtable.

To invoke an operation on an mtable object reference requires one indirection from the object reference to the mtable for the interface, and one indirection through a function pointer in the mtable. An additional indirection is used in the embodiment of the present invention to invoke methods from inherited interfaces. The additional indirection is from the mtable of the apparent type to the mtable for the type that declared the operation.

Figure 4:
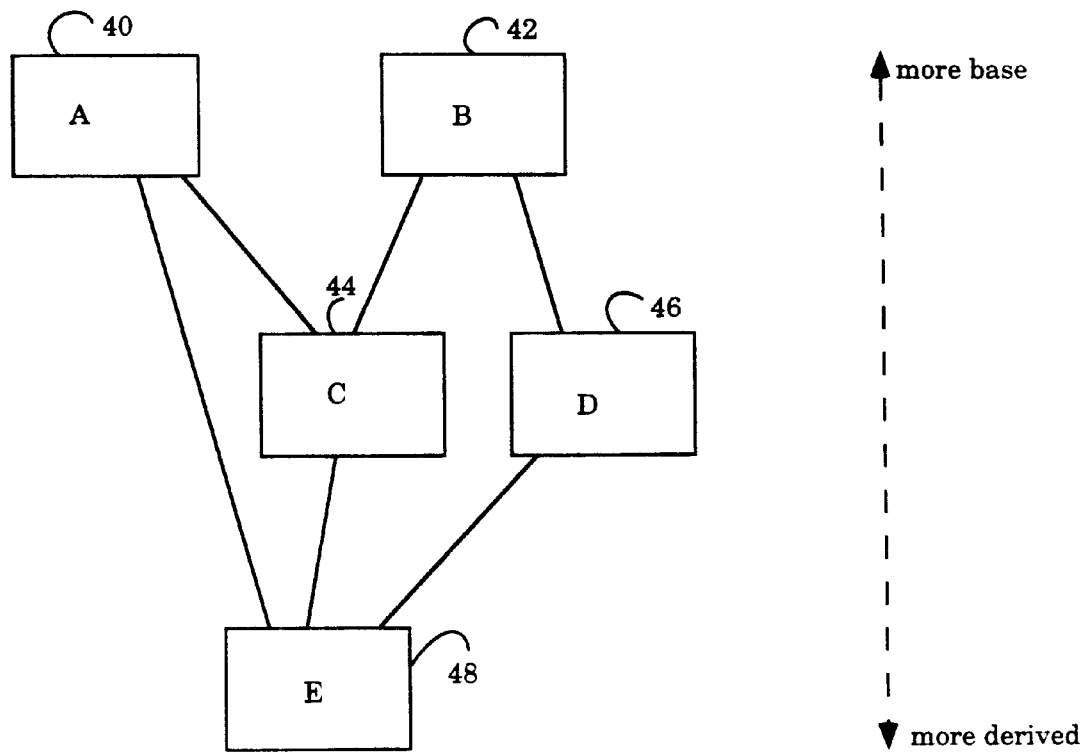
FIG. 4 is an inheritance diagram illustrating the relationship of a set of object types for an implementation of mtables of the present invention.

FIG. 4 is a diagram illustrating an exemplary inheritance structure of an object representation using mtables of the present invention. Object types A 40 and B 42 do not inherit from any other object types. Object type C 44 inherits from A 40 and B 42, and object type D 46 inherits from object type B 42. In addition, object type E 48 inherits from object types A 40, C 44 and D 46. The structure of FIG. 4 illustrates multiple inheritance where a base class is multiply inherited. Only one method table is required for each base class of an object and the method table can be pointed at by all classes which inherit the method table. Object types A 40 and B 42 are base classes for the remaining object types. Object type E 48 is the most derived object type within the inheritance structure illustrated in FIG. 4.

The following three scenarios exist during execution of a client application, given that an operation XX is invoked on object E 48: the operation XX is defined in interface E, or it is defined in a base interface of E, or it is not defined in the interface hierarchy. An interface compiler generates code such that if the XX operation is defined directly in the E interface, the invocation passes through the XX slot in the mtable pointed to by the object reference. If the XX operation is defined in a base interface, the interface compiler generates code which indirects through the appropriate base mtable pointer in the mtable pointed to by the object reference and calls the method pointed to by the XX slot in that second mtable. If the operation is not defined in the hierarchy, the interface compiler does not generate any code, and client applications which attempt to call the operation do not compile.

In the current embodiment, it is possible to reach any base mtable from an apparent mtable in one indirection. In alternate embodiments, where the inheritance hierarchy may be represented differently, one or more indirections may be required to reach the mtable defining the operation. The client code looks the same regardless of whether the operation is defined on the apparent interface of the object reference or on a base interface, i.e. the client has an object reference and invokes the XX method on the object reference. The interface compiler's task is to know where to find the pointer to the XX method in the mtable hierarchy.

FIG. 5 is a C++ type declaration 120 for the mtables of the exemplary interface hierarchy illustrated in FIG. 4. An mtable for a derived interface contains pointers to the mtable for the base interfaces. When the interface compiler is constructing the mtable for a derived interface, the interface compiler builds into the mtable a pointer to any base mtables; the interface compiler does not have to build the base mtables themselves. The interface compiler for the derived interface depends on the base mtables already having been constructed, at least to the point where the interface compiler is able to obtain the address of the base mtables.

In C or C++, the declaration of mtables is performed by referencing the base mtables as external symbols, and allowing the linker to fill in the slot in the derived mtable. The mtable is all "compile-time" constants, since the mtable consists of counts and addresses of methods and addresses of base mtables, and addresses of type identifiers.

FIG. 6 illustrates exemplary constructors 130 for the mtables illustrated in FIG. 5. FIG. 6 illustrates mtable instances for one implementation. In an alternate implementation such as for a local implementation, parallel instances of each mtable having pointers to local implementations and local mtables for base interfaces are used.

Figure 7:
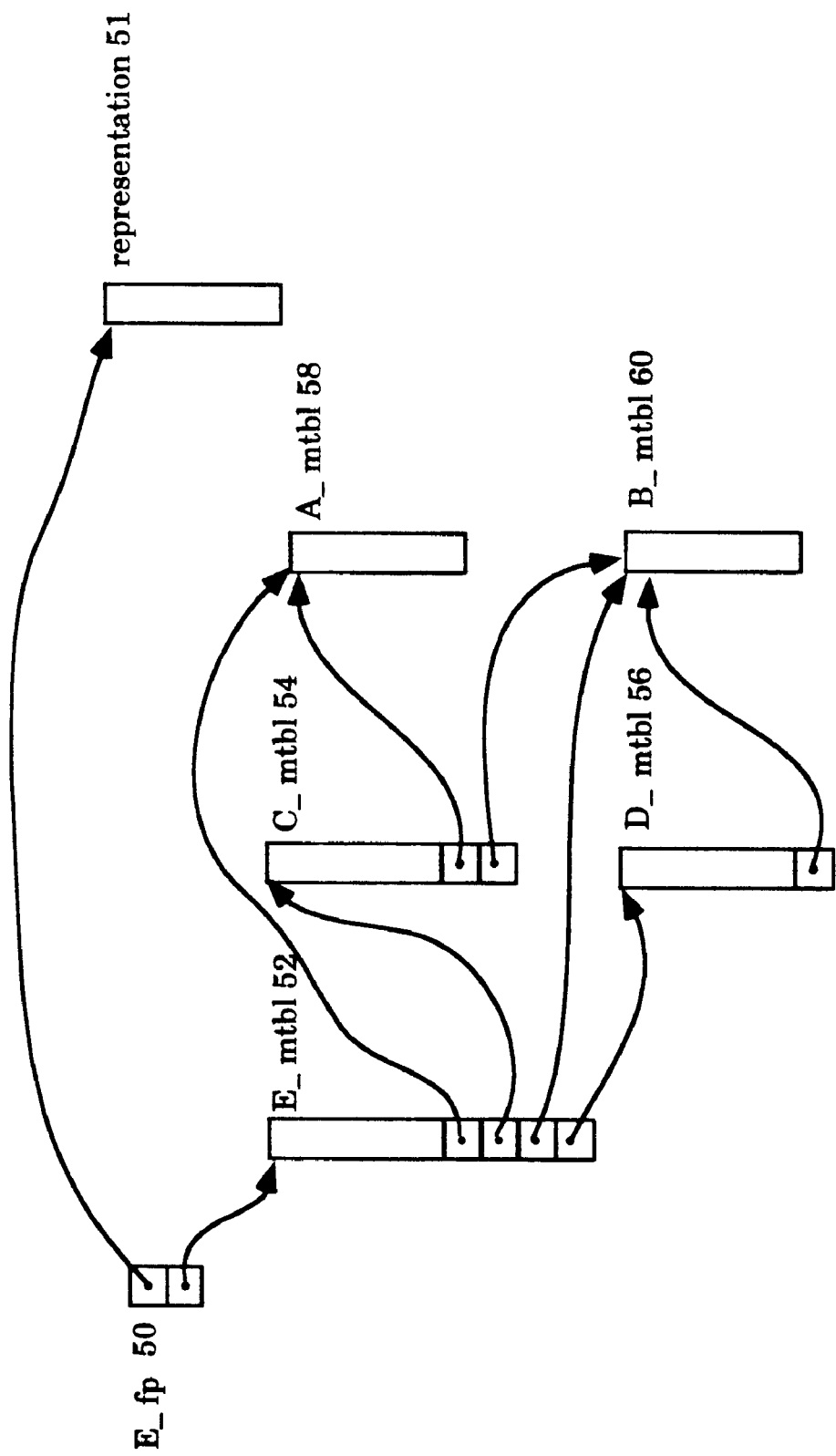
FIG. 7 illustrates an exemplary implementation of mtables of the present invention.

FIG. 7 is an exemplary implementation of an object reference with multiple inheritance using mtables of the present invention. The implementation of FIG. 7 corresponds to the inheritance structure of FIG. 4. E_fp 50 represents an object reference for an object of type E. E_mtbl 52 is a method table for E objects, C_mtbl 54 is a method table for C objects, D_mtbl 56 is a method table for D objects, A_mtbl 58 is a method table for A objects, and B_mtbl 60 is a method table for B objects. Representation 51 is a representation of an object. Neither A_mtbl 58 nor B_mtbl 60 refer to any base mtables. A_mtbl 58 contains function pointers to the methods for object type A. B_mtbl 60 contains function pointers to the methods for object type B.

Object type C inherits from object types A and B. C_mtbl 54 contains function pointers for the methods for object type C and pointers to the method tables for object types A and B. D_mtbl 56 inherits from object type B and contains function pointers for methods defined in object type D and a pointer to B_mtbl 60. E_mtbl 52 inherits from object types A, B, C and D, and contains function pointers for the methods defined in object type E as well as pointers to the method tables for object types A, B, C and D. Methods declared on an interface are accessible through the method table for that interface and methods declared on an inherited interface are accessible by indirection through their respective method table pointers. The blank upper portion of each method table represents the portion of the method table which contains function pointers.

When an inheritance is an interface inheritance, only the method signatures of the base class are inherited by any class derived from that base class. Thus, implementation of the base class is not inherited. This is in contrast to the prior art C++ vtables in which implementations of members of the base class are inherited by any class derived from that class.

Figure 8:
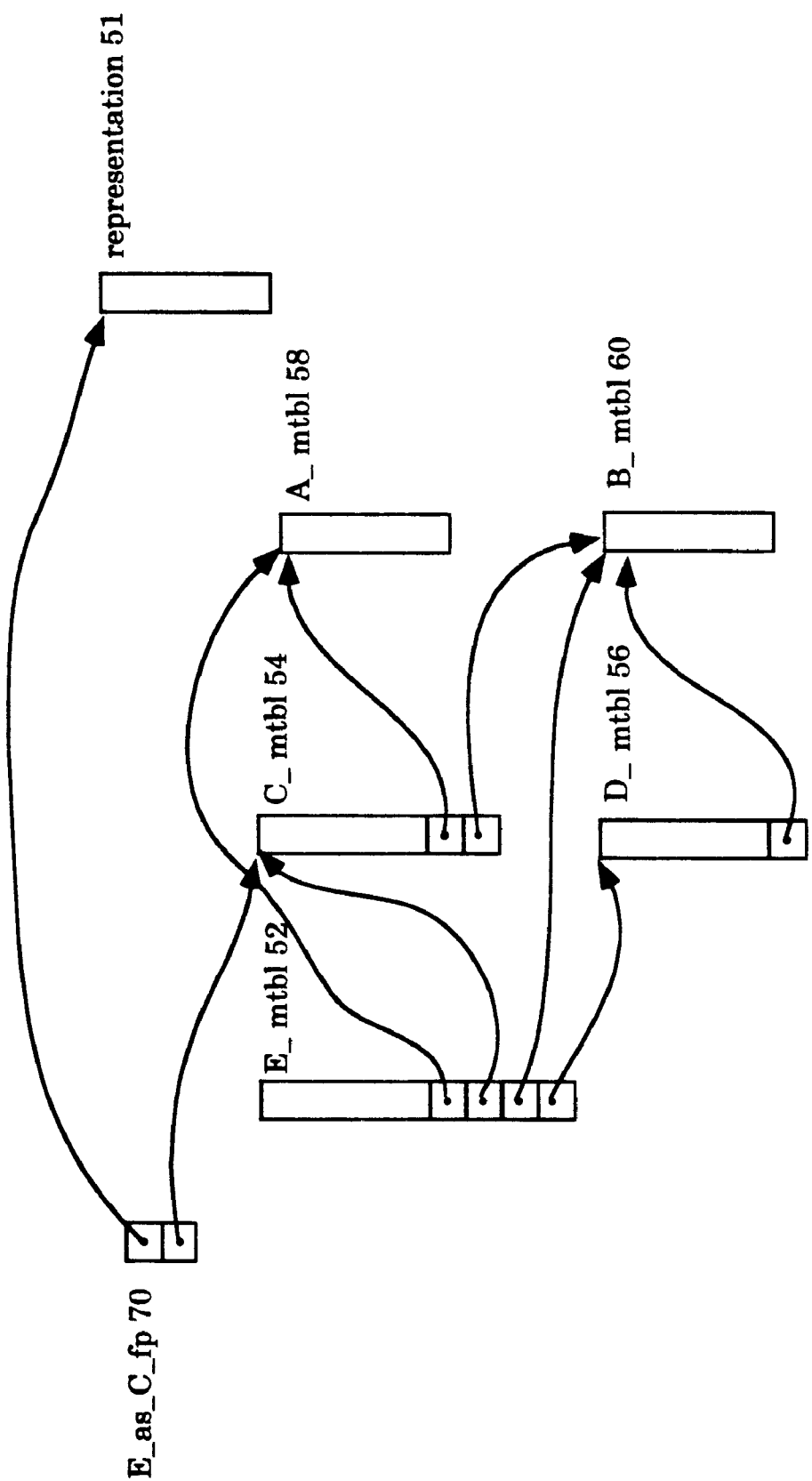
FIG. 8 illustrates the effect of widening the implementation of FIG. 5.

FIG. 8 represents the effect of widening the object reference illustrated in FIG. 7. Widening may be effectuated by combining a pointer which points to the same representation with a pointer which points to a different mtable, one for the appropriate base class. Thus, a new object reference that consists of the original representation pointer and a pointer to the mtable for the wider interface is constructed. The mtable for the wider interface can be found by indexing into the mtable for the derived interface and fetching the mtable for the base interface. The resultant object reference is illustrated by E_as C_fp 70.

E_as C_fp 70 is a widened object reference which points to the same representation as the object reference of FIG. 7 but also points to C_mtbl 54. Internally, E_as C_fp 70 points to the representation and the appropriate subset of the methods for an object type C. Narrowing, like widening, is implemented by constructing a new object reference that consists of the original pointer to the representation and a pointer to the mtables for the narrower interface.

An advantage of mtables is that mtables are language independent. Mtable object references can be passed between languages without requiring conversions on the object references. For example, invocation of an operation defined in an interface of an apparent type of an object reference may be described in C programming language by (* (objref.mtable->operation))(objref.representation). Further, any actual parameters for the call can be passed after the representation pointer.

An invocation of an operation defined in an inherited interface may be described in the C programming language by (*(objref.mtable->inherited->operation)) (objref.representation). The operations in the inheritance lattice are known at compile time. Thus, the offsets of the operation and inherited mtables within an mtable are compiletime constants.

The space requirements of mtables are small in contrast to, for example, C++ vtables which require a different vtable instance for each class that virtually inherits each base class. For each client-visible implementation of an interface, there is only one mtable that points to the operations and inherited mtables for that interface. This is regardless of the apparent interface of the object reference from which the mtable is found. In addition, mtable operations are fast. Mtable operation pointers point to static methods, and the mtable pointers point to other statically defined mtables. Thus, mtables need no initialization at object instantiation.

Yet another advantage of mtables are that mtables support programming languages in which there is inheritance on the interfaces. An example of such type of programming language is an interface definition language (IDL) from the Object Management Group, Inc. of Framingham, Mass. A difference between IDL and other languages is for example, that IDL defines only interface inheritance. The use of mtables allows IDL invocations between implementation languages without the need for any object reference argument conversions.

One of the advantages of the present invention is that mtables support alternate implementations of the operations on an interface. Alternate mtables for an interface may be provided for use in object references as desired. Different mtables may be provided including mtables that call, for example, client-side stub methods, or mtables that point to local implementations. Mtables implement interface inheritance and dispatch. The operations on the interfaces are implemented by the functions called from the mtable. The representation is used to hold whatever state is necessary. All mtables are shared when implementations of methods are for remote procedure call stubs in a distributed object-oriented system using an interface definition language supporting interface inheritance.

What has been described is a method and mechanism for invocation on objects with interface inheritance. An object reference using mtables of the present invention provides for a pointer to the data for an object and a pointer to the methods on the object. The methods on the object are represented by a collection of mtables. The methods defined in the apparent interface of the object reference are represented by pointers to the implementations of those methods, and the methods defined in base interfaces of the object reference are represented by pointers to mtables for the base interfaces that contain pointers to the implementation of those methods. Object references using mtables of the present invention support programming languages in which there is inheritance of interfaces. Further, mtables support alternate implementations and can be used from multiple languages. In addition, mtables are small and are fast in contrast to prior art methods and apparatus for implementing an object reference such as C++ vtables.

While certain exemplary embodiments have been described in detail and shown in the accompanying drawings, it is to be understood that such embodiments are merely illustrative of and not restrictive on the broad invention, and that this invention not be limited to the specific arrangements and constructions shown and described, since various other modifications may occur to those ordinarily skilled in the art.

What is claimed is:

1. A computer implemented method for invocation of operations on objects with interface inheritance in an object oriented programming environment on a data processor containing memory, in which a plurality of objects are categorized into classes according to related operations, said method comprising:

creating an mtable for an apparent interface for an object, the mtable including a plurality of pointers to functions for said interface and a plurality of pointers to additional mtables, said additional mtables being for a plurality of inherited interfaces of said object and having the same table structure as said mtable for said apparent interface;

providing an identifier field including identifier information for said mtable contained within said mtable;

providing a first count field identifying a numerical count of said plurality of pointers to functions contained within said mtable;

providing a second count field identifying a numerical count of said plurality of pointers to additional mtables contained within said table;

pointing to data for said object using a pointer, said pointer being part of an object reference, said data for said object being separate from said object reference;

pointing to said mtable for said object using a pointer, said pointer being part of said object reference, said pointing to data and said pointing to said mtable being facilitated by said object reference using separate pointers; and invoking a plurality of operations on said data and said mtable pointed to by said object reference.

2. The method of claim 1, further comprising representing mtables into operations per interface, said mtables having pointers to said operations, and pointers to base mtables, said pointers representing interface inheritance.

3. The method of claim 1, further comprising representing said operations on said object by a collection of mtables.

4. The method of claim 1 wherein said plurality of pointers to functions, point to functions implementing operations declared in said interfaces.

5. The method of claim 1, further comprising representing separate graphs of mtables for different implementations of operations.

6. The method of claim 1, further comprising sharing mtables among classes for a common implementation of operations.

7. The method of claim 1, further comprising sharing all mtables when implementations are remote procedure call stubs in a distributed object-oriented system using an interface definition language which supports interface inheritance.

8. An apparatus for invocation of operations on objects with interface inheritance in an object oriented programming environment on a data processor containing memory, in which a plurality of objects are categorized into classes according to related operations, said apparatus comprising:

a plurality of mtables, one being for an apparent interface for an object, the mtable including a plurality of pointers to functions for said interface, and a plurality of pointers to additional mtables, said additional mtables being for a plurality of inherited interfaces of said object and having the same table structure as said mtable for said apparent interface, said separate pointer and said table structure allowing for more efficient handling of the invocation of operation on said object with said plurality of inherited interfaces;

an identifier field including identifier information for said mtable contained within said mtable;

a first count field identifying a numerical count of said plurality of pointers to functions contained within said mtable;

a second count field identifying a numerical count of said plurality of pointers to additional mtables contained within said table;

a pointer to data for said object, said pointer being part of an object reference, said data for said object being separate from said object reference;

a pointer to said mtable for said object, said pointer being part of said object reference, said pointer to said data and said pointer to said mtable facilitated by said object reference using separate pointers; and circuitry invoking a plurality of operations on said data and said plurality of mtables pointed to by said object reference.

9. The apparatus of claim 8 further comprising a representation of the collection of mtables for said operations on said object.

10. The apparatus of claim 8 wherein said functions implementing an operation declared in said interfaces.

11. The apparatus of claim 8, further comprising a representation of mtables, one mtable per class of object, said mtables having pointers to operations, and pointers to mtables, said pointers representing interface inheritance.

12. The apparatus of claim 11, further comprising a representation of separate graphs of mtables for different implementations of operations.

13. The apparatus of claim 12, further comprising shared mtables, said shared mtables shared among classes for a common implementation of operations.

14. The apparatus of claim 13, wherein said shared mtables are shared when said implementations are remote procedure call stubs in a distributed object-oriented system using an interface definition language which supports interface inheritance.

15. A computer system for invocation of operations on objects with interface inheritance in an object oriented programming environment on a data processor containing memory, in which a plurality of objects are categorized into classes according to related operations, said system comprising:

a plurality of mtables, one being for an apparent interface for an object, the mtables having a table structure including an identifier of said interface, a plurality of pointers to functions for said interface, and a plurality of pointers to additional mtables, said additional mtables being for a plurality of inherited interfaces of said object and having the same table structure as said mtable for said apparent interface, said separate pointer and said table structure allowing for more efficient handling of the invocation of operation on said object with said plurality of inherited interfaces;

an identifier field including identifier information for said mtable contained within said mtable;

a first count field identifying a numerical count of said plurality of pointers to functions contained within said mtable;

a second count field identifying a numerical count of said plurality of pointers to additional mtables contained within said table;

a pointer to data for said object, said pointer being part of an object reference, said data for said object being separate from said object reference;

a pointer to said mtable for said object, said pointer being part of said object reference, said pointer to said data and said pointer to said mtable facilitated by said object reference using separate pointers;

circuitry invoking a plurality of operations on said data and said plurality of mtables pointed to by said object reference; and a compiler for generating said plurality of mtables.

16. The computer system of claim 15, further comprising a representation of the collection of mtables for said operations on said object.

17. The computer system of claim 15 wherein said functions implement operations declared in said interfaces.

18. The computer system of claim 15, further comprising a representation of mtables, one mtable per class of object, said mtables having pointers to said operations, and pointers to mtables, said pointers representing interface inheritance.

19. The computer system of claim 18, further comprising a representation of the separate graphs of mtables for different implementations of operations.

20. The computer system of claim 18, further comprising shared mtables, said shared mtables shared among classes for a common implementation of operations.

21. The computer system of claim 20, wherein said shared mtables are shared when said implementations are remote procedure call stubs in a distributed object-oriented system using an interface definition language which supports interface inheritance.

* * * * *